(12) United States Patent
Kongouji

(10) Patent No.: US 10,782,426 B2
(45) Date of Patent: Sep. 22, 2020

(54) RADIATION DETECTOR

(71) Applicant: CANON ELECTRON TUBES & DEVICES CO., LTD., Otawara-shi (JP)

(72) Inventor: Toyohisa Kongouji, Nasushiobara (JP)

(73) Assignee: CANON ELECTRON TUBES & DEVICES CO., LTD., Otawara-shi (JP)

( * ) Notice: Subject to any disclaimer, the term of this patent is extended or adjusted under 35 U.S.C. 154(b) by 19 days.

(21) Appl. No.: 16/217,577

(22) Filed: Dec. 12, 2018

(65) Prior Publication Data

US 2019/0277980 A1 Sep. 12, 2019

(30) Foreign Application Priority Data

Mar. 12, 2018 (JP) .................. 2018-044590

(51) Int. Cl.
| | |
|---|---|
| G01T 1/20 | (2006.01) |
| G01T 1/208 | (2006.01) |
| H04N 5/32 | (2006.01) |
| H04N 5/365 | (2011.01) |
| H04N 5/361 | (2011.01) |

(52) U.S. Cl.
CPC ............ *G01T 1/208* (2013.01); *G01T 1/2006* (2013.01); *H04N 5/32* (2013.01); *H04N 5/361* (2013.01); *H04N 5/3655* (2013.01)

(58) Field of Classification Search
CPC .......... G01T 1/208; G01T 1/2006; H04N 5/32
See application file for complete search history.

(56) References Cited

U.S. PATENT DOCUMENTS

| | | | |
|---|---|---|---|
| 6,115,451 A | 9/2000 | Boudry et al. | |
| 2012/0140882 A1* | 6/2012 | Iwakiri | A61B 6/4233 378/62 |
| 2013/0271628 A1* | 10/2013 | Ku | H04N 5/361 348/243 |

FOREIGN PATENT DOCUMENTS

JP 2000-189411 7/2000

* cited by examiner

*Primary Examiner* — Hugh Maupin
(74) *Attorney, Agent, or Firm* — Oblon, McClelland, Maier & Neustadt, L.L.P.

(57) ABSTRACT

According to one embodiment, a radiation detector includes detection parts detecting radiation directly or in cooperation with a scintillator, a controller reading out a signal charge from each detection part, a memory part storing an upper limit and a lower limit of a normal pixel value in a dark image preliminarily obtained and data about a temperature dependence of the upper and lower limits, and a temperature sensor measuring a temperature of the radiation detector. The controller reads out the signal charge from each detection part in a state of no intended radiation irradiation and images the dark image, acquires a temperature when the dark image measured by the temperature sensor is imaged, extracts the upper and lower limits corresponding to the acquired temperature from the memory part, and inspects a pixel value in the imaged dark image by using the extracted upper limit and the lower limit.

20 Claims, 6 Drawing Sheets

RADIATION DETECTOR

CROSS-REFERENCE TO RELATED APPLICATIONS

This application is based upon and claims the benefit of priority from Japanese Patent Application No. 2018-044590, filed on Mar. 12, 2018; the entire contents of which are incorporated herein by reference.

FIELD

Embodiments described herein relate generally to a radiation detector.

BACKGROUND

There is an X-ray detector as one example of a radiation detector. The X-ray detector is provided with, for example, a scintillator converting an incident X-ray to fluorescence, an array substrate provided with multiple photoelectric conversion parts (corresponding to pixels of an X-ray image) converting the fluorescence from the scintillator to a signal charge, a signal processing circuit reading out the signal charge for each of the multiple photoelectric conversion parts, and an image constitution circuit constituting the X-ray image on the basis of the read out signal charge or the like. The photoelectric conversion part is provided with a photoelectric conversion element converting the fluorescence to the signal charge, a thin film transistor switching storage and discharge of the signal charge, and a storage capacitor storing the signal charge or the like.

Generally, the X-ray detector forms the X-ray image as follows. Firstly, the incidence of the X-ray is recognized by a signal input from the outside. Next, after the predetermined time, the thin film transistor of the photoelectric conversion part performing reading is turned on, and the stored signal charge is read out. The X-ray image is constituted on the basis of a value of the signal charge read out for each of the photoelectric conversion parts.

Here, the value of the signal charge read out for each of the photoelectric conversion parts includes a value corresponding to an X-ray dose and a value corresponding to a leak current of the photoelectric conversion element and the thin film transistor. For that reason, when constituting the X-ray image, an offset processing (offset correction) is performed, in which a value corresponding to the leak current in each photoelectric conversion part is subtracted from the value of the signal charge in each photoelectric conversion part. In the offset processing, in order to remove the value corresponding to the leak current, a value in a pixel corresponding to a dark image (a pixel value in the dark image) is set to be subtracted from a value in each pixel of the X-ray image (a pixel value of the X-ray image).

In such a case, if the pixel value in the dark image fluctuates, the accurate offset processing may be impossible. For that reason, a technique in which the dark image is imaged between imaging of the X-ray image and data about the dark image are updated regularly has been proposed.

However, there is a possibility that troubles may occur in the imaged dark image. For example, a portion of the X-ray irradiated toward the adjacent X-ray detector may enter the X-ray detector which is imaging the dark image. In such a case, a value corresponding to unintended X-ray incidence is added to the value corresponding to the leak current. For that reason, the reliability of the pixel value in the obtained dark image is lowered.

Then, it has been desired to develop a radiation detector which can improve the reliability of the pixel value in the dark image.

DETAILED DESCRIPTION

Figure 1:
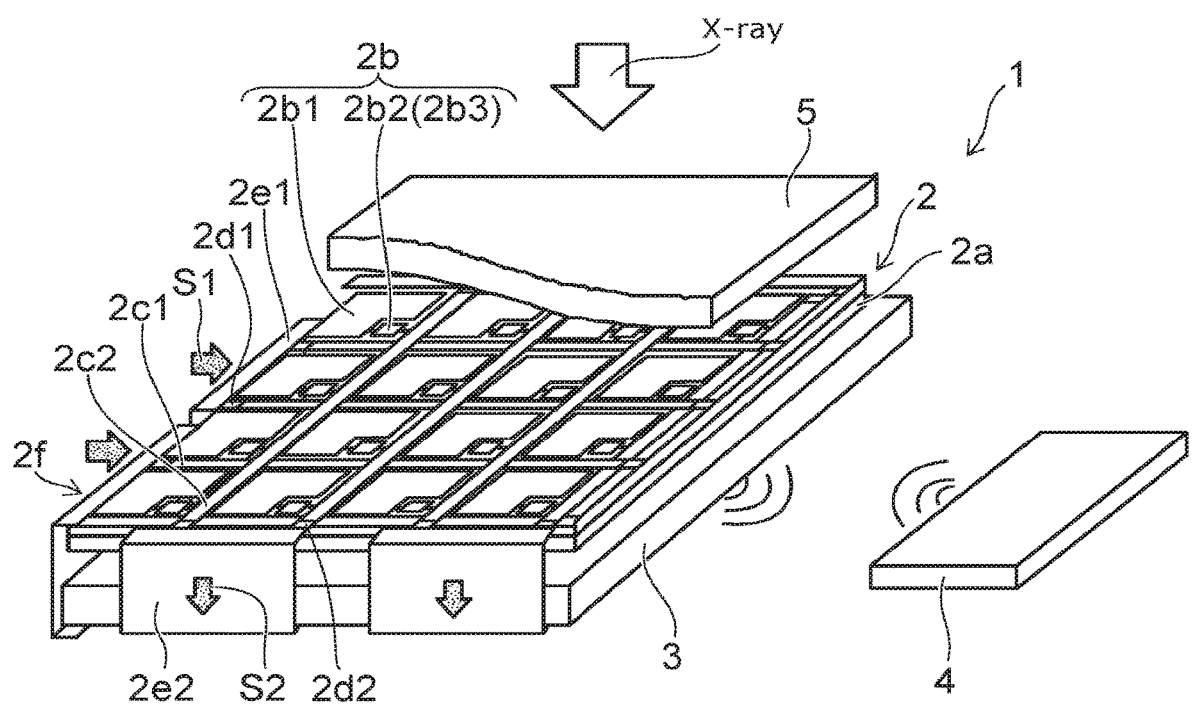
FIG. 1 is a schematic perspective view for illustrating an X-ray detector.

According to one embodiment, a radiation detector includes a plurality of detection parts detecting radiation directly or in cooperation with a scintillator, a controller reading out a signal charge from each of the detection parts, a memory part storing an upper limit and a lower limit of a normal pixel value in a dark image preliminarily obtained and data about a temperature dependence of the upper limit and the lower limit, and a temperature sensor measuring a temperature of the radiation detector. The controller reads out the signal charge from each of the detection parts in a state of no intended radiation irradiation and imaging the dark image, acquires a temperature when the dark image measured by the temperature sensor is imaged, extracts the upper limit and the lower limit corresponding to the acquired temperature from the memory part, and inspects a pixel value in the imaged dark image by using the extracted upper limit and the lower limit.

Various embodiments will be described hereinafter with reference to the accompanying drawings. In the drawings, similar components are marked with like reference numerals, and a detailed description is omitted as appropriate.

The radiation detector according to the embodiment can be applied to various radiations such as a γ-ray other than an X-ray. Here, the case of the X-ray as a representative of radiations is described as one example. Therefore, the radiation detector can also be applied to other radiation by replacing "X-ray" of the following embodiments with "other radiation".

The X-ray detector 1 illustrated below is an X-ray plane sensor detecting an X-ray image which is a radiation image. The X-ray plane sensor includes a direct conversion method and an indirect conversion method broadly.

The direct conversion method is a method that a photoconductive charge (signal charge) generated inside a photoconductive film by the incident X-ray is introduced directly to a storage capacitor for charge storage by a high electric field.

The indirect conversion method is a method that the X-ray is converted to fluorescence (visible light) by a scintillator, the fluorescence is converted to the signal charge by a photoelectric conversion element such as a photodiode, and the signal charge is introduced to the storage capacitor.

In the following, the X-ray detector 1 of the indirect conversion method is illustrated as one example, however the invention can also be applied to the X-ray detector of the indirect conversion method. Since a well-known art can be applied to a detection part of the X-ray of the direct conversion method, the detail description will be omitted.

That is, the X-ray detector may be a detector including multiple detection parts that detect the X-ray directly or in cooperation with the scintillator.

The X-ray detector 1 can be used for, for example, general medical application or the like, and the application is not limited.

FIG. 1 is a schematic perspective view for illustrating the X-ray detector 1. In FIG. 1, a bias line 2c3 or the like is omitted.

Figure 2:
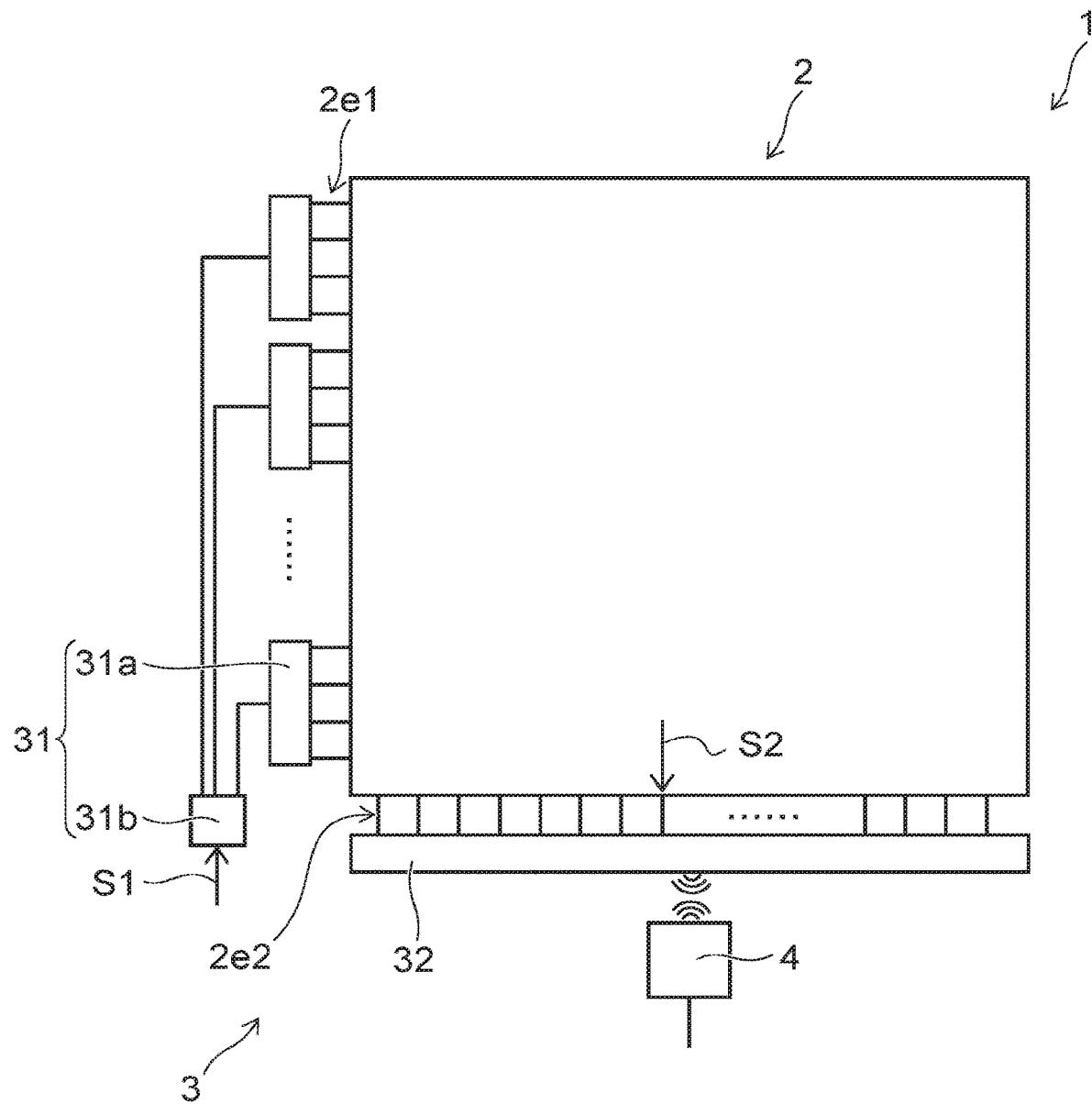
FIG. 2 is a block diagram of the X-ray detector.

FIG. 2 is a block diagram of the X-ray detector 1.

Figure 3:
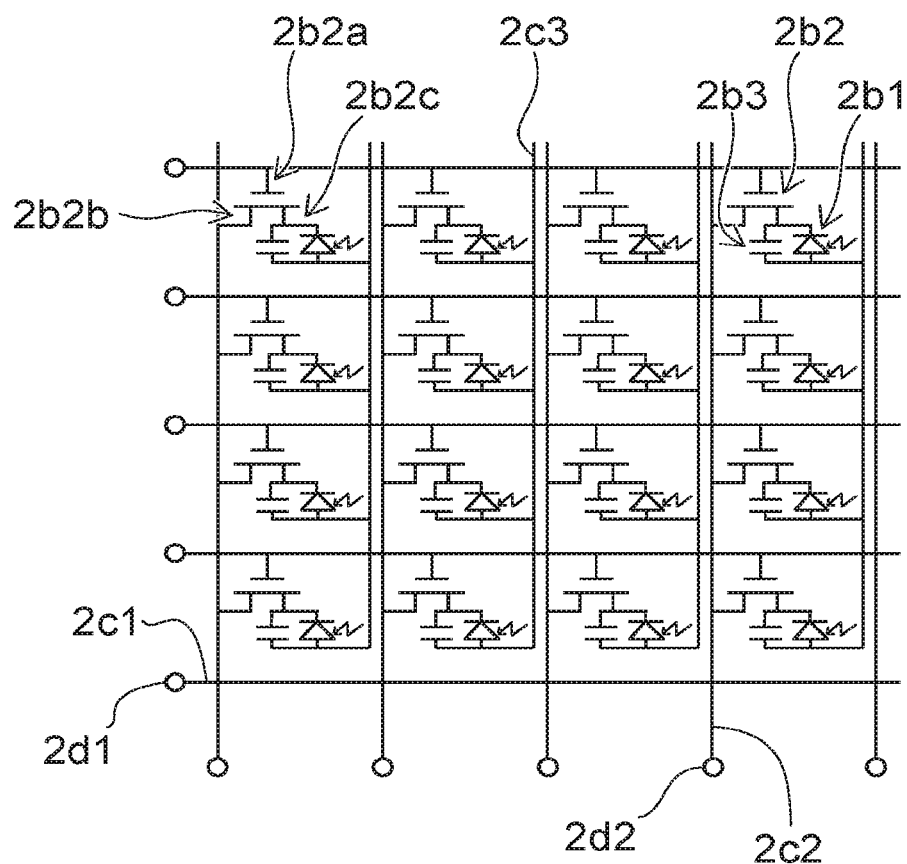
FIG. 3 is a circuit diagram of an array substrate.

FIG. 3 is a circuit diagram of an array substrate 2.

Figure 4:
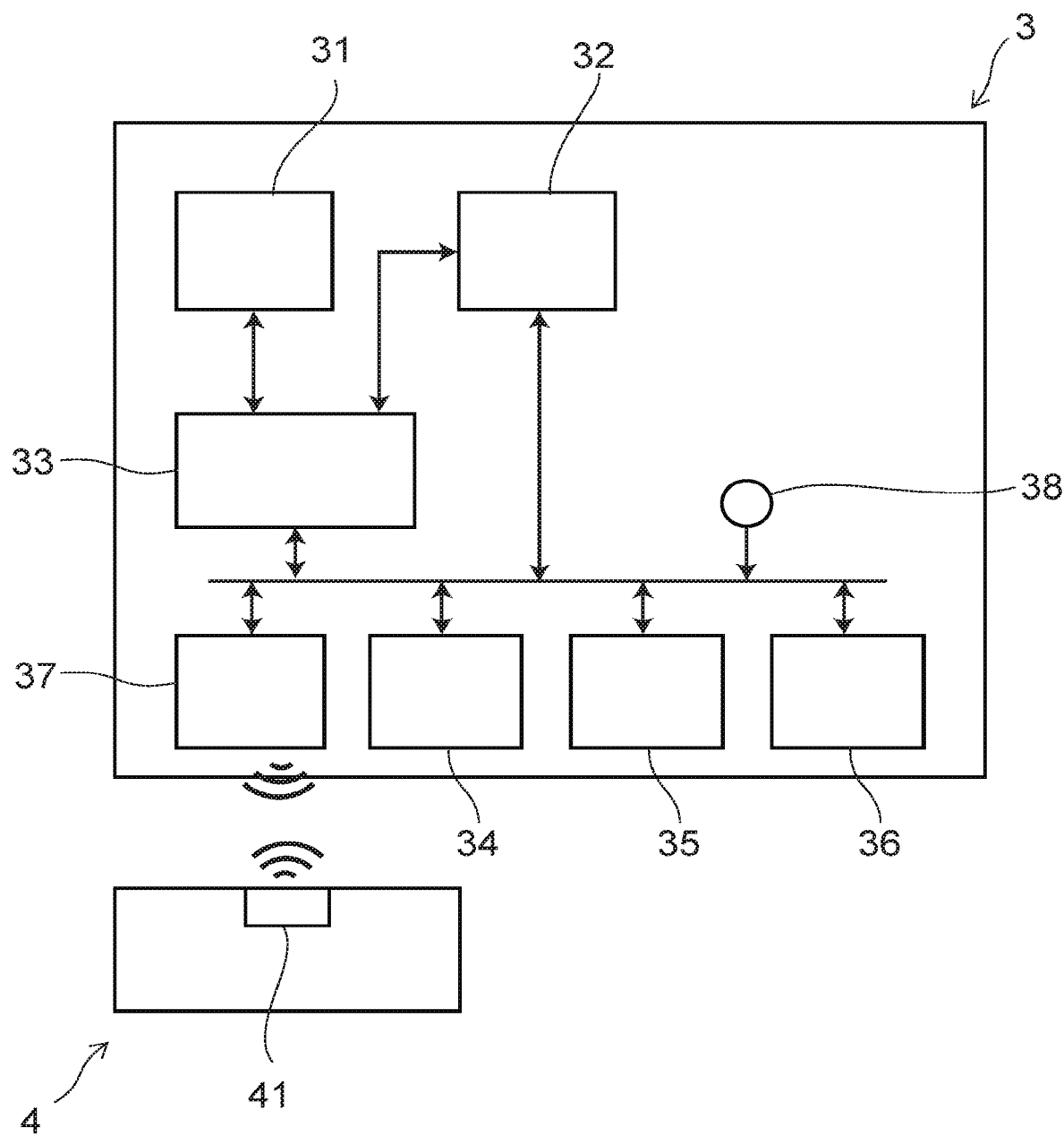
FIG. 4 is a block diagram of a signal processing circuit.

FIG. 4 is a block diagram of a signal processing circuit 3.

As shown in FIG. 1 and FIG. 2, the X-ray detector 1 is provided with the array substrate 2, the signal processing circuit 3, an image constituting circuit 4, and a scintillator 5.

The X-ray detector 1 can be provided with a not shown housing storing the array substrate 2, the signal processing circuit 3 and the scintillator 5. A not shown support plate can be provided inside the housing. The array substrate 2 and the scintillator 5 can be provided on an X-ray incident side surface of the support plate. The signal processing circuit 3 can be provided on an opposite side surface to the X-ray incident side surface of the support plate. The X-ray detector 1 can be provided with the not shown housing storing the image constituting circuit 4.

The array substrate 2 converts the fluorescence (visible light) converted from the X-ray by the scintillator 5 to an electric signal.

As shown in FIG. 1 and FIG. 3, the array substrate 2 includes a substrate 2a, a photoelectric conversion part 2b, a control line (or gate line) 2c1, a data line (or signal line) 2c2, and a bias line 2c3.

The number of the photoelectric conversion part 2b, the control line 2c1, the data line 2c2, and the bias line 2c3 or the like is not limited to the illustration.

The substrate 2a is plate-shaped, and is formed of a light transmissive material such as a non-alkali glass.

The photoelectric conversion part 2b is provided multiply on one surface of the substrate 2a.

The photoelectric conversion part 2b is rectangle-shaped, and is provided in a region drawn by the control line 2c1 and the data line 2c2. The multiple photoelectric conversion parts 2b are arranged in a matrix configuration.

One photoelectric conversion part 2b corresponds to one picture element (pixel) in the X-ray image.

In the embodiment, the photoelectric conversion part 2b serves as a detection part cooperating with the scintillator 3 to detect the X-ray.

Each of the multiple photoelectric conversion parts 2b is provided with a photoelectric conversion element 2b1, and a thin film transistor (TFT) 2b2 which is a switching element.

As shown in FIG. 3, a storage capacitor 2b3 which stores the signal charge converted in the photoelectric conversion element 2b1 can be provided. The storage capacitor 2b3 is, for example, rectangular flat plate-shaped, and can be provided under the respective thin film transistors 2b2. However, depending on a capacity of the photoelectric conversion element 2b1, the photoelectric conversion element 2b1 can serve as the storage capacitor 2b3.

The photoelectric conversion element 2b1 can be, for example, a photodiode or the like.

The thin film transistor 2b2 performs switching of storing and releasing a charge generated by incidence of the fluorescence to the photoelectric conversion element 2b1. The thin film transistor 2b2 includes a gate electrode 2b2a, a drain electrode 2b2b and a source electrode 2b2c. The gate electrode 2b2a of the thin film transistor 2b2 is electrically connected to the corresponding control line 2c1. The drain electrode 2b2b of the thin film transistor 2b2 is electrically connected to the corresponding data line 2c2. The source electrode 2b2c of the thin film transistor 2b2 is electrically connected to the corresponding photoelectric conversion element 2b1 and the storage capacitor 2b3. An anode side of the photoelectric conversion element 2b1 and the storage capacitor 2b3 are electrically connected to the corresponding bias line 2c3.

The control line 2c1 is provided multiply to be parallel to each other with a prescribed spacing. The control lines 2c1 extend, for example, in a row direction.

One control line 2c1 is electrically connected to one of multiple wiring pads 2d1 provided near the periphery of the substrate 2a. One of multiple wirings provided on a flexible printed board 2e1 is electrically connected to one wiring pad 2d1. Other ends of the multiple wirings provided on the flexible printed board 2e1 are electrically connected to a control circuit 31 provided in the signal processing circuit 3.

The data lines 2c2 are provided multiply to be parallel to each other with a prescribed spacing. The data lines 2c2 are, for example, in a column direction orthogonal to the row direction.

One data line 2c2 is electrically connected to one of multiple wiring pads 2d2 provided near the periphery of the substrate 2a. One of multiple wirings provided on a flexible printed board 2e2 is electrically connected to one wiring pad 2d2. Other ends of the multiple wirings provided on the flexible printed board 2e2 are electrically connected to a signal detection circuit 32 provided in the signal processing circuit 3.

The bias line 2c3 is provided to be parallel to the data line 2c2 between the data line 2c2 and the data line 2c2.

A not shown bias power supply is electrically connected to the bias line 2c3. The not shown bias power supply can be provided, for example, in the signal processing circuit 3 or the like.

The bias line 2c3 is not always necessary, and may be provided as necessary. In the case where the bias line 2c3 is not provided, the anode side of the photoelectric conversion element 2b1 and the storage capacitor 2b3 are electrically connected to the ground in place of the bias line 2c3.

The control line 2c1, the data line 2c2 and the bias line 2c3 can be formed based on a low resistance metal, for example, such as aluminum and chromium or the like.

A protection layer 2f covers the photoelectric conversion part 2b, the control line 2c1, the data line 2c2, and the bias line 2c3.

The protection layer 2f includes, for example, at least one of an oxide insulating material, a nitride insulating material, an oxynitride insulating material, or a resin material.

The signal processing circuit 3 is provided on an opposite side to the scintillator 5 side of the array substrate 2.

As shown in FIG. 4, the signal processing circuit 3 is provided with the control circuit 31, the signal detection circuit 32, a controller 33, a memory part 34, a memory part 35, a memory part 36, a communication circuit 37, and a temperature sensor 38.

The controller 31 switches between on state and off state of the thin film transistor 2b2.

As shown in FIG. 2, the control circuit 31 includes multiple gate drivers 31a and a row selection circuit 31b.

A control signal S1 is input to the row selection circuit 31b. The control signal S1 can be input to the row selection circuit 31b, for example, on the basis of a program or the like for imaging the X-ray image described later. The row selection circuit 31*b* inputs the control signal S1 to the corresponding gate driver 31*a* in accordance with a scanning direction of the X-ray image.

The gate driver 31*a* inputs the control signal S1 to the corresponding control line 2*c*1. For example, the gate driver 31*a* sequentially inputs the control signal S1 to each control line 2*c*1 via a flexible printed board 2*e*1. The thin film transistor 2*b*2 is turned on by the control signal S1 input to the control line 2*c*1, and a signal charge (image data signal S2) from the photoelectric conversion part 2*b* can be received.

When the thin film transistor 2*b*2 is in the on state, the signal detection circuit 32 reads out the signal charge (image data signal S2) from the storage capacitor 2*b*3 via the data line 2*c*2 and the flexible printed board 2*e*2 in accordance with a sampling signal from the image constituting circuit 4.

The controller 33 controls operations of the control circuit 31, the signal detection circuit 32, and the communication circuit 37 on the basis of the program stored in the memory part 34. For example, the controller 33 reads out the signal charge from each of the multiple photoelectric conversion parts 2*b*. The controller 33 can be, for example, CPU (Central Processing Unit) or the like.

The controller 33 inspects imaging of the dark image and the pixel value in the imaged dark image. The detail of the inspection of the pixel value of the dark image will be described later.

The memory part 34 stores the program for controlling the operations of the control circuit 31 and the signal detection circuit 32. In this case, the memory part 34 can store the program for imaging the X-ray image, the program for imaging the dark image, and the program for inspecting the pixel value in the dark image.

The memory part 35 stores temporally the read out image data signal S2, namely, the data of the imaged X-ray image, the data of the dark image, and the data of the temperature at imaging the dark image.

The memory part 36 stores the upper limit and the lower limit of normal pixel value in the dark image preliminarily obtained and the data about the temperature dependence of the upper limit and the lower limit. The details about those will be described.

The memory part 34, the memory part 35 and the memory part 36 can be, for example, a semiconductor memory or a hard disk drive or the like.

The communication circuit 37 transmits radio waves having the read out image data signal S2. The communication circuit 37 receives radio waves having control information such as X-ray incidence timing or the like. The communication circuit 37 includes, for example, a transmission circuit, a reception circuit, and an antenna. The transmission circuit may have, for example, a circuit generating a high frequency signal, an amplifier circuit increasing the high frequency signal to a predetermined power, a modulation circuit placing the image data signal S2 on the high frequency signal or the like. The radio waves having the image data signal S2 are transmitted to the outside of the housing storing the array substrate 2, the signal processing circuit 3 and the scintillator 5 via the antenna. The reception circuit demodulates the radio waves having the control information received via the antenna to restore the control information. The restored control information is input to the controller 33 or the like.

The temperature sensor 38 measures the temperature of the X-ray detector 1. For example, the temperature sensor 38 can be provided in the signal processing circuit 3. The temperature sensor 38 can convert the temperature to an electric signal. The temperature sensor 38 can be, for example, a thermocouple, a thermistor, a resistance temperature detector or the like. The controller 33 stores the temperature data measured by the temperature sensor 38 when imaging the dark image to the memory part 35.

The image constituting circuit 4 is provided with a communication circuit 41. The communication circuit 41 includes, for example, a transmission circuit, a reception circuit and an antenna. The transmission circuit may have, for example, a circuit generating a high frequency signal, an amplifier circuit increasing the high frequency signal to a predetermined power, a modulation circuit placing the constituted data of the X-ray image on the high frequency signal or the like. The radio waves having the constituted data of the X-ray image are transmitted to the outside of the housing of the image constituting circuit 4 via the antenna. The reception circuit demodulates the radio waves having the image data signal S2 received via the antenna to restore the image data signal S2.

The image constituting circuit 4 sequentially amplifies the restored image data signal S2, converts the amplified image data signal S2 (analogue signal) to a digital signal, and constitutes the X-ray image on the basis of the image data signal S2 converted to the digital signal. The constituted data of the X-ray image is transmitted toward an external device such as a display device by the transmission circuit.

A case where data communication between the signal processing circuit 3 and the image constituting circuit 4 is performed wirelessly is illustrated, however the invention is not limited thereto. The signal processing circuit 3 and the image constituting circuit 4 are electrically connected by a wiring and then the data communication may be performed by wire. When the data communication is performed by wiring, the communication circuit 37 and the communication circuit 41 can be omitted. The signal processing circuit 3 and the image constituting circuit 4 can also be integrated.

However, if the data communication is made to be performed wirelessly, portability of a detection portion of the X-ray detector 1 (the housing storing the array substrate 2, the signal processing circuit 3 and the scintillator 5) can be removed.

The scintillator 5 is provided on the multiple photoelectric conversion elements 2*b*1, and converts the incident X-ray to the fluorescence. The scintillator 5 is provided to cover a region (effective pixel region) where the multiple photoelectric conversion parts 2*b* on the substrate 2*a* are provided.

The scintillator 5 can be formed based on, for example, cesium iodide (CsI):thallium (Tl), or sodium iodide (NaI): thallium (Tl) or the like. In this case, if the scintillator 5 is formed by using a vacuum deposition method or the like, the scintillator 5 made of multiple columnar crystal aggregations is formed.

The scintillator 5 can also be formed based on, for example, gadolinium oxysulfide ($Gd_2O_2S$) or the like. In this case, the square pillar-shaped scintillator 5 can be provided for every multiple photoelectric conversion parts 2*b*.

Other, in order to increase a utilization efficiency of the fluorescence and improve sensitivity characteristics, a reflection layer not shown can be provided so as to cover a surface side (an incident surface side of the X-ray) of the scintillator 5.

In order to suppress the characteristics of the scintillator 5 and the characteristics of the reflection layer not shown from being deteriorated by water vapor included in air, a moisture proof body not shown covering the scintillator 5 and the reflection layer not shown can be provided.

A secondary battery can be provided inside the housing or on an outer surface of the housing which stores the array substrate 2, the signal processing circuit 3 and the scintillator 5. The secondary battery can be, for example, a lithium ion battery or the like. In this way, the portability of the detection portion of the X-ray detector 1 can be improved. Also, the secondary battery can also be provided inside the housing or on an outer surface of the housing which stores the image constituting circuit 4.

Next, the operation of the X-ray detector 1 will be described.

First, imaging of the X-ray image will be illustrated.

In the imaging of the X-ray image, first, the controller 33 reads out the program for imaging the X-ray image stored in the memory part 34.

Next, the controller 33 controls the actions of the control circuit 31, the signal detection circuit 32 and the communication circuit 37 or the like on the basis of the program for performing imaging the dark image.

For example, the controller 33 controls the control circuit 31, and sequentially turns on multiple thin film transistors 2b2. When the thin film transistors 2b2 are turned on, a certain charge is stored in the storage capacitors 2b3 via the bias line 2c3.

Next, the controller 33 controls the control circuit 31 and turns off the multiple thin film transistors 2b2.

When the X-ray radiated from the X-ray source is incident on the scintillator 5, the X-ray is converted to the fluorescence by the scintillator 5. When the fluorescence is incident on the photoelectric conversion element 2b1, a charge (electron or hole) is generated by a photoelectric effect, and the generated charge combines with the charge stored in the storage capacitor 2b3 (heterogeneous charge) to decrease the stored charge.

Next, the controller 33 recognizes the X-ray incidence by the signal from the X-ray source or the like. In this case, the signal from the X-ray source is input to the controller 33 via the communication circuit 37. In the case where a detector which detects the X-ray incidence is provided in the X-ray detector 1, the controller 33 recognizes the X-ray incidence by the signal from the relevant detector.

Next, after a predetermined time passes, the controller 33 controls the control circuit 31 and sequentially turns on the multiple thin film transistors 2b2. Also, the controller 33 controls the signal detection circuit 32, and reads out the decreased charge which is stored in the respective storage capacitors 2b3 (image data signal S2) via the data line 2c2 in accordance with the sampling signal.

Next, the controller 33 controls the communication circuit 37 and transmits the radio waves with the read out image data signal S2.

Next, the image constituting circuit 4 receives the radio waves with the read out image data signal S2, restores the image data signal S2, and constitutes the X-ray image on the basis of the restored image data signal S2.

In this way, the X-ray image is imaged.

Here, the value of the read out signal charge for each photoelectric conversion part 2b includes a value corresponding to the X-ray dose and a value corresponding to the leak currents of the photoelectric conversion element 2b1 and the thin film transistor 2b2. For that reason, when constituting the X-ray image, the offset processing (offset correction) is performed, in which the value corresponding to the leak current in each photoelectric conversion part 2b is subtracted from the value of the signal charge in each photoelectric conversion part 2b.

In this case, the value in each pixel of the X-ray image which is imaged in the state of no X-ray irradiation (dark image) includes the value corresponding to the leak current, but does not include the value corresponding to the X-ray dose. For that reason, in the offset processing, in order to remove the value corresponding to the leak current, the value in the pixel corresponding to the dark image (the pixel value in the dark image) is subtracted from the value in each pixel of the X-ray image (the pixel value of the X-ray image).

However, unintended X-ray may be incident to the X-ray detector 1. For example, a portion of the X-ray irradiated toward the adjacent X-ray detector may be incident to the X-ray detector 1 which is imaging the dark image. In the case like this, a value corresponding to the unintended X-ray incidence is added to the value corresponding to the leak current. For that reason, the reliability of the pixel value of the obtained dark image is reduced.

In this case, if multiple dark images are imaged and the average of the pixel value for each pixel is used for the offset processing, the reliability of the pixel value in the dark value can be increased. If the number of imaging the dark image is increased, the reliability of the pixel value in the dark image can be further increased. However, if the multiple dark images are imaged and the number of imaging is increased, the power consumption of the X-ray detector 1 may increase and the waiting time may become longer.

The pixel value in the dark image is the value corresponding to the leak currents of the photoelectric conversion element 2b1 and the thin film transistor 2b2, and thus has the temperature dependence. That is, when the temperature of the photoelectric conversion element 2b1 or the thin film transistor 2b2 or the like changes, the pixel value in the obtained dark image changes.

Then, in the X-ray detector 1 according to the embodiment, the pixel value in the dark image which is obtained as follows is inspected.

In the imaging of the dark image, first, the controller 33 reads out the program for imaging the dark image stored in the memory part 34.

Next, the controller 33 controls the actions of the control circuit 31, the signal detection circuit 32, and the communication circuit 37 or the like on the basis of the program for performing imaging the dark image.

For example, the controller 33 controls the control circuit 31, and sequentially turns on multiple thin film transistors 2b2. When the thin film transistors 2b2 are turned on, a certain charge is stored in the storage capacitors 2b3 via the bias line 2c3.

Next, the controller 33 controls the control circuit 31 and turns off the multiple thin film transistors 2b2.

Next, after a predetermined time passes, the controller 33 controls the control circuit 31 and sequentially turns on the multiple thin film transistors 2b2. Also, the controller 33 controls the signal detection circuit 32, and reads out the charge which is stored in the respective storage capacitors 2b3 (image data signal S2) via the data line 2c2 in accordance with the sampling signal.

In this way, one sheet of the dark image is imaged.

That is, the controller 33 reads out the signal charge from each of the multiple photoelectric conversion parts 2b in the state of no unintended X-ray irradiation and images the dark image. The imaging of the dark image can be performed, for example, between imaging the X-ray image.

The controller 33 stores the data of the imaged dark image and the data of the temperature when imaging the dark image to the memory part 35.

Here, the memory part 36 stores the upper limit and the lower limit of the normal pixel value in the dark image and the data about the temperature dependence of the upper limit and the lower limit. These data are obtained preliminarily and are stored in the memory part 36 during manufacturing the X-ray detector 1.

Figure 5:
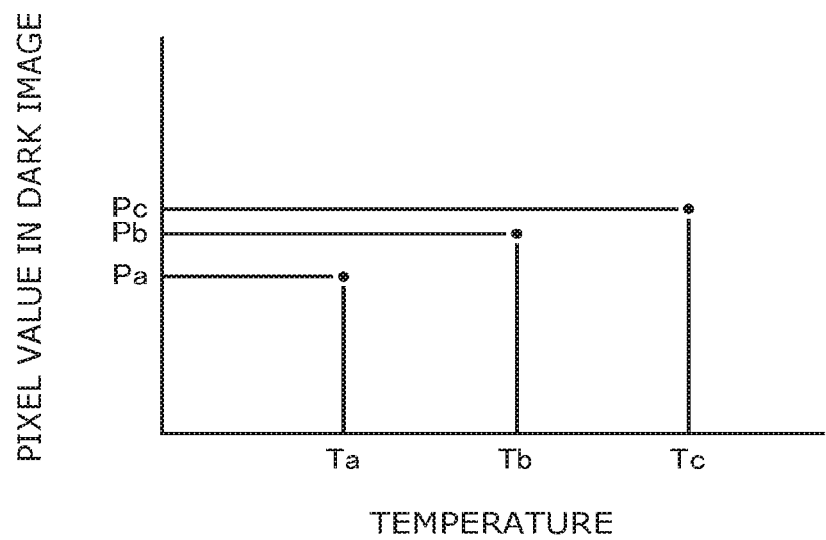
FIG. 5 is a schematic graph view for illustrating the relationship between the pixel value in the dark image and the temperature.

FIG. 5 is a schematic graph view for illustrating the relationship between the pixel value in the dark image and the temperature.

As previously described, the pixel value in the dark image is the value corresponding to the leak currents of the photoelectric conversion element 2$b$1 or the thin film transistor 2$b$2, and thus has the temperature dependence.

For that reason, as shown in FIG. 5, if the temperatures Ta to Tc change, the pixel values Pa to Pc change. As a result, the upper limit and the lower limit of the normal pixel value in the dark image also change. The data about the temperature dependence of the upper limit and the lower limit can be acquired by performing a preliminary experiment or the like. In the case where the equation or the approximation equation of the temperature dependence is obtained by the acquired data, the equation or the approximation equation of the temperature dependence can be stored in the memory part 36. In the case where the equation or the approximation equation of the temperature dependence cannot be obtained, the data of the temperature dependence can be stored as a table.

The upper limit and the lower limit may be either obtained from one sheet of dark image or obtained from the multiple dark images.

Next, the controller 33 inspects the pixel value in the imaged dark image which is stored in the memory part 35.

The controller 33, first, acquires the temperature when the dark image measured by the temperature sensor 38 is imaged from the memory part 35.

Continuingly, the controller 33 extracts the upper limit and the lower limit corresponding to the acquired temperature from the memory part 36.

Continuingly, the controller 33 inspects all pixel values in the imaged dark images by using the extracted upper limit and the lower limit.

Here, since the number of pixels in the dark image is extremely large, if the all pixel values are inspected, the inspection time becomes longer.

For that reason, the controller 33 obtains the average value of the pixel value in the imaged dark image, and can configure to inspect the average. In this case, the average value may be obtained from the maximum value and the minimum value of the pixel value in the imaged dark image. In this way, the inspection time can be shorter.

Continuingly, the controller 33 determines whether the pixel value in the imaged dark image or the average value of the pixel value is between the upper limit and the lower limit extracted from the memory part 36 or not.

In the case where these values are between the upper limit and the lower limit, the controller 33 determines that the inspected dark image is the normal dark image. In the case where these values are not between the upper limit and the lower limit, the controller 33 determines that the inspected dark image is abnormal.

The data of the dark image which is determined to be abnormal can be discarded.

In the case where the controller 33 determines the dark image to be abnormal, the dark image can be imaged again. The imaging the dark image can be repeated until determination to be normal dark image is made.

In this way, the reliability of the pixel value in the dark image can be improved.

Next, the controller 33 performs the offset processing by using the pixel value in the dark image which is determined to be normal. For example, the controller 33 subtracts the pixel value in the corresponding pixel of the dark image which is determined to be normal from the pixel value in each pixel of the imaged X-ray images. In this way, noise or the like due to the leak current can be removed.

Figure 6:
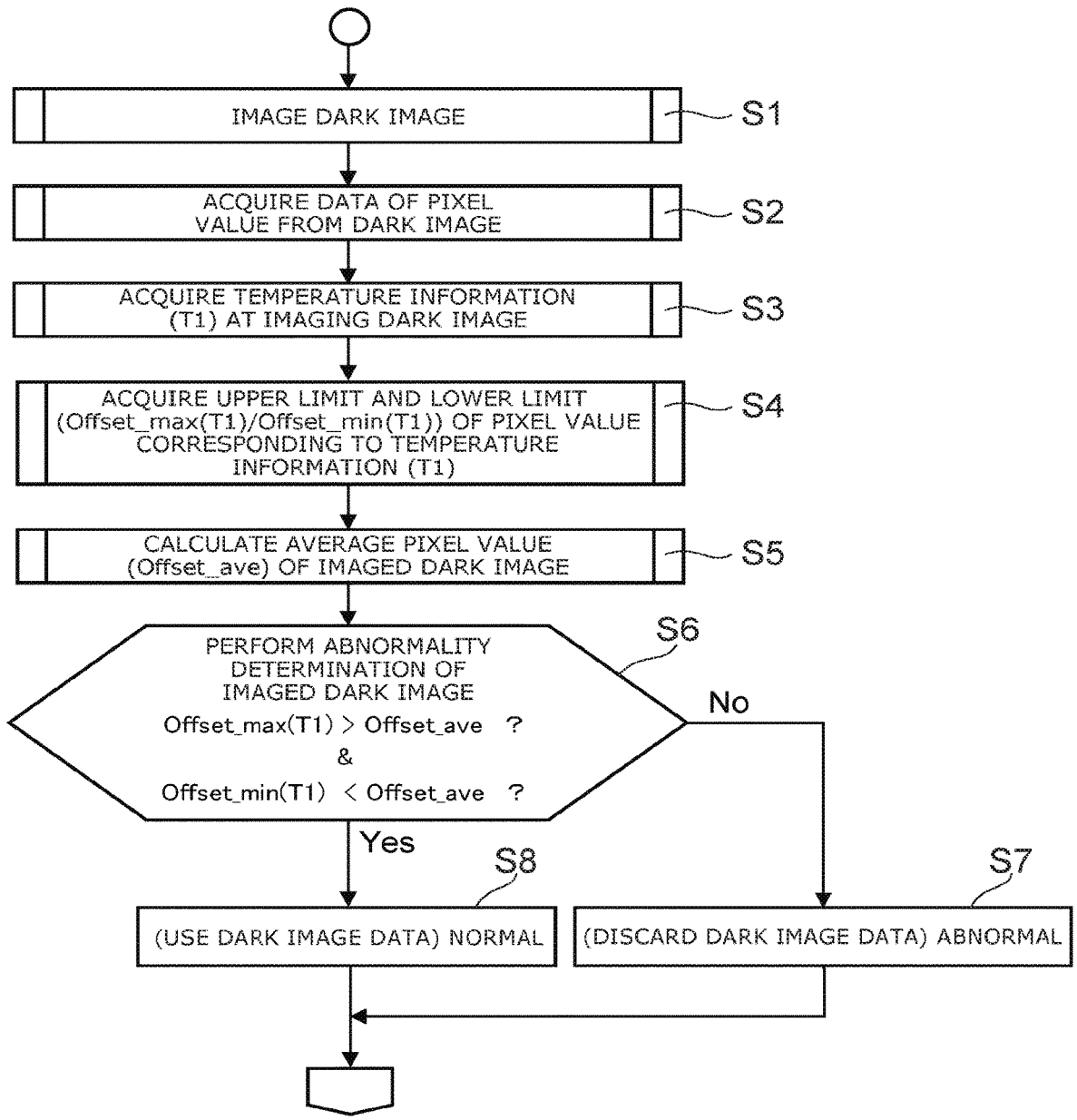
FIG. 6 is a flow chart for illustrating inspection of the pixel value in the dark image.

FIG. 6 is a flow chart for illustrating the inspection of the pixel value in the dark image.

As shown in FIG. 6, first, the dark image is imaged. (Step S1)

Next, the data of the pixel value is acquired from the imaged dark image. (Step S2)

Next, the temperature information at imaging the dark image (T1) is acquired. (Step S3)

Next, the upper limit and the lower limit (Offset max (T1)/Offset mini (T1)) of the normal pixel value corresponding to the temperature information (T1) are preliminarily obtained. (Step S4)

Next, the average value (Offset ave) is obtained from the maximum value and the minimum value in the imaged dark image (the dark image to be inspected). (Step S5)

Next, the abnormal determination of the imaged dark image is performed by using the upper limit, the lower limit and the average value. (Step S6)

In the case where determined to be abnormal, the data of the relevant dark image is discarded. (Step S7)

In the case where determined to be normal, the offset processing is performed by using the data of the relevant dark image. (Step S8)

Since the content for each step can be similar to those described above, a detailed description will be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A radiation detector comprising:
   a plurality of detection parts configured to detect radiation directly or in cooperation with a scintillator;
   a controller configured to read out a signal charge from each of the detection parts;
   a memory part configured to store an upper limit and a lower limit of a normal pixel value in a dark image preliminarily obtained and data about a temperature dependence of the upper limit and the lower limit; and
   a temperature sensor configured to measure a temperature of the radiation detector,
   the controller further configured to
      read out the signal charge from each of the detection parts in a state of no intended radiation irradiation and image the dark image,
      acquire the temperature measured by the temperature sensor when the dark image is imaged,
      extract the upper limit and the lower limit corresponding to the acquired temperature from the memory part, and inspect whether a pixel value in the imaged dark image includes a value corresponding to unintended incidence of radiation by using the extracted upper limit and the extracted lower limit, the pixel value in the imaged dark image is determined to include the value corresponding to the unintended incidence of radiation when the pixel value is not between the upper limit and the lower limit.

2. The detector according to claim 1, wherein
the controller determines the dark image to be abnormal, when the pixel value is determined to include the value corresponding to the unintended incidence of radiation because the pixel value in the imaged dark image is not between the upper limit and the lower limit.

3. The detector according to claim 2, wherein
the controller being further configured to image the dark image again when the dark image is determined to be abnormal.

4. The detector according to claim 3, wherein
the controller repeats imaging of the dark image until the dark image is determined to be normal.

5. The detector according to claim 2, wherein
the controller discards data of the dark image determined to be abnormal when the dark image is determined to be abnormal.

6. The detector according to claim 1, wherein
the controller determines the dark image to be normal when the pixel value in the imaged dark image is between the upper limit and the lower limit.

7. The detector according to claim 6, wherein
the controller reads out the signal charge from each of the detection parts in a state of intended radiation irradiation and images a radiation image, and subtracts a pixel value in a pixel corresponding to the dark image determined to be normal from a pixel value in each pixel of the imaged radiation image.

8. The detector according to claim 1, wherein
the controller obtains an average value of the pixel value in the imaged dark image, and inspects the average value by using the upper limit and the lower limit.

9. The detector according to claim 8, wherein
the average value of the pixel value is obtained from a maximum value and a minimum value of the pixel value in the dark image.

10. The detector according to claim 8, wherein
the controller determines the dark image to be abnormal when the average value is not between the upper limit and the lower limit.

11. The detector according to claim 10, wherein
the controller images the dark image again when the dark image is determined to be abnormal.

12. The detector according to claim 11, wherein
the controller repeats imaging of the dark image until the dark image is determined to be normal.

13. The detector according to claim 10, wherein
the controller discards data of the dark image determined to be abnormal when the dark image is determined to be abnormal.

14. The detector according to claim 8, wherein
the controller determines the dark image to be normal when the average value is between the upper limit and the lower limit.

15. The detector according to claim 14, wherein
the controller reads out the signal charge from each of the detection parts in a state of intended radiation irradiation, images a radiation image, and subtracts a pixel value in a pixel corresponding to the dark image determined to be normal from a pixel value in each pixel of the imaged radiation image.

16. The detector according to claim 1, wherein
the data about the temperature dependence of the upper limit and the lower limit is an equation about the temperature dependence or an approximation equation about the temperature dependence.

17. The detector according to claim 1, wherein
the data about the temperature dependence of the upper limit and the lower limit is a table including a relationship between the upper limit and temperature and a relationship between the lower limit and the temperature.

18. The detector according to claim 1, wherein
the pixel value in the dark image between the upper limit and the lower limit is a value corresponding to a leak current of one or more of the plurality of detection parts.

19. The detector according to claim 1, wherein
the temperature sensor is one of a thermocouple, a thermistor, and a resistance temperature detector.

20. The detector according to claim 1, wherein
each of the plurality of detection parts includes a photoelectric conversion element and a thin film transistor.

* * * * *